J. S. PHILLIPS.
Assayer's Self-Calculating Sample and Button-Weigher.
No. 215,477. Patented May 20, 1879.
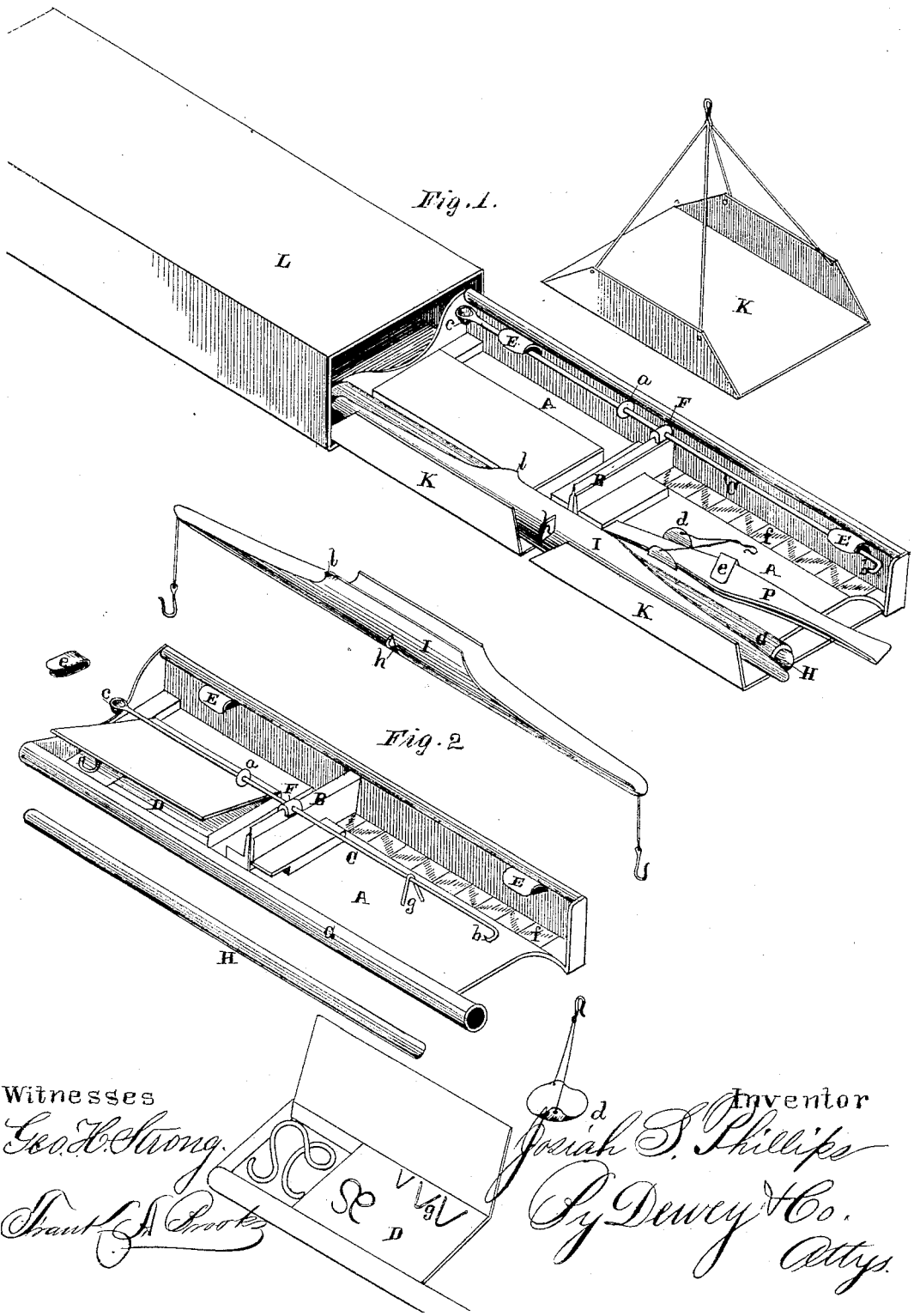

UNITED STATES PATENT OFFICE.

JOSIAH S. PHILLIPS, OF SAN FRANCISCO, CALIFORNIA.

IMPROVEMENT IN ASSAYERS' SELF-CALCULATING SAMPLE AND BUTTON WEIGHERS.

Specification forming part of Letters Patent No. 215,477, dated May 20, 1879; application filed December 2, 1878.

*To all whom it may concern:*

Be it known that I, JOSIAH S. PHILLIPS, of the city and county of San Francisco, and State of California, have invented a Self-Calculating Sample and Button Weigher; and I hereby declare the following to be a full, clear, and exact description thereof, reference being had to the accompanying drawings.

My invention relates to a novel apparatus for assayers' and prospectors' use, which I call "the little wonder self-calculating sample and button weigher."

It consists in a combination and arrangement, in one machine, of weighing-scales, balances, weights, forceps, and calculating tables or scales, whereby I am enabled to provide a simple and ready apparatus, with which the prospector can accurately determine the dollars per ton in gold and silver, as well as the thousandths fine and percentage.

In the accompanying drawings, Figure 1 is a view of the apparatus packed and ready to go into its case. Fig. 2 is a view of the separated parts of the apparatus.

The stand or case A is made of metal, and has an open top and ends, as shown. Across the center of this stand or case is an upright division-piece, on which is placed the inverted knife-edge B, on which the beam C is balanced. This beam C is formed of metal in any desired shape, and has at one end, and forming a permanent part of it, the conical platinum cup c, the shape being such as to assure the correct position for the globular button from the cupel. As this cup is a part of the beam it avoids having to use a pan, and thus reduces the friction. At the other end of the beam is a small turned knife-edged crook, b, on which may be hooked a pan, d, so as to weigh substances in the ordinary manner by those who prefer it. To balance this aluminum-pan when attached to the crook by means of its hook and silk cord, a balance-clasp, e, is placed horizontally on the other end of the beam, and moved on the beam to compensate the weight of said pan. The pan may then be used for weighing the sample and button in the usual manner. That end of the case A over which the turned crook b on the beam comes is cut away, as shown, so that when the beams are in position the pan can hang below the case when said pan is used.

On the back of the case are two lugs or catches, E, which hold the beam in position when it is not in use, or when packed away for traveling. The knife-edge on which the center of the beam rests extends to the back of the case, and by sliding the beam back and slightly springing the ends under the lugs it is held firmly in place. These lugs are curved, so that as the beam is sprung under the edges the beam has no pressure on the ends to bend it, but is safely held by the lugs, so that it cannot be displaced.

At the center of the beam is placed the gudgeon-piece or inverted knife-action F, which is grooved, as shown, so that the groove or saddle compresses the knife-edge B. This inverted knife-action at the center of the beam reduces the ordinary double knife-actions to only one, and by aid of the peculiarly-made light beam enables the ends to move a full half-inch under a one-hundredth of one troy grain, or eight times as much as the best assay-balance.

The three frictions out of the ordinary four incident to the double knife-action and also the ordinary knife-edges at each end are reduced by this means to one, so that the beam is very much more delicate.

The weights for use on this beam are made in the form of riders, and are kept in the weight-case D, having a hinged cover and forming part of the main stand or case, as shown. On the beam is fitted the permanent adjusting or regulating paper disk or weight $a$, which may be slid back or forth on the beam, by which the balance of the beam is adjusted before weighing. The sliders or weights are made V-shaped, so as to ride the beam, and are made of three colors for easier discrimination. The lightest one may be made of blue silk, the next heavier of white nickel or silver, and the heaviest of copper, so as to be red in color. I then place on the inside of the case under the beam a scale, $f$, marked or printed on paper with properly-marked cross-lines, which, in combination with the different colored and weighted riders, give the value of the gold or silver assay-button in dollars and cents per ton or thousandths fine and hundredths without the necessity of even the use of figures or any calculation whatever on the part of the operator.

For blow-pipe assaying of silver, with the smallest self-calculating weight, the beam is balanced correctly by means of the little regulator $a$, and then the operator tries which of the V-shaped weights $g$ will balance the button, trying the largest first by putting it astride the beam on the opposite side of the center from the button. The light-blue silk rider is made equal to $100 per ton at the outer and tenth cross-line at the end of the scale, or $10 per ton for each and every cross-line. The white rider equals $1,000 per ton at the end or tenth line, or $100 for each cross-line, and the red or copper rider equals $10,000 per ton, or $1,000 for each and every cross-line on the scale.

The lower side of the case or stand A is turned over, so as to form a circular hollow side, G, as shown, and inside of the tube thus formed is placed the large bar-weight H, which is used for a balance for samples of ore, as hereinafter described.

The heavy beam I is made semi-tubular at its center, the ends being beveled away, as shown, and at the center on the closed side is cut the diamond-shaped slot $h$, by which the beam I is kept in proper position in balance on the knife-edge B. This beam is made of the length of the case or stand A, and as the knife-edge is placed at a central point in the case between the edge of the cut-away portion of the case under the turned crook on the small beam when it is in position, when the large beam I is in place, the ends will therefore project past the ends of the case far enough for the strings carrying the hooks into which the pans K are hung to hang down without touching the case, allowing the beam to vibrate freely. This beam I is used for weighing samples of auriferous quartz and large silver assays, and the two pans K which are used with it are hung to the hooks on each end. The pans have only two sides, and when not in use are placed under the stand or case, their sides projecting upward, so as to inclose said case. The three weights used with this beam and pans are made of different sizes. The largest one, H, is kept in the tube G at the side of the case, and is used for weighing gold samples to be assayed either by blow-pipe or furnace after water-concentration. The next in size, a yellow S-C-shaped weight, is for silver by furnace, and the smallest for blow-pipe silver-assays. The two latter are kept in the weight-case D when not in use, each made of S-C shape to indicate that they are self-calculating weights. These self-calculating weights are intended for weighing the samples to be assayed, the resultant buttons being weighed on the other beam by the other weights, as herein described, but with this difference: that when the large weights are used the scale indicates ten times less, or, respectively, $1,000, $100, and $10, and each mark on the scale only $1, with intervening diagonal marks for cents.

By weighing a sample of bullion or base-metal ores to equal either of the riders alluded to or any other quantity by a rider-shaped weight, the thousandths fine of such metals or percentage of such ores may be known at sight, after cupellation or reduction, by simply placing each of the several resultant buttons in the cup and sliding the same rider to correct the balance upon the other end of the beam opposite the appropriate scale.

It will readily be seen by taking suitable quantities, as provided by the large yellow bar-weight for gold and the yellow S-C weight for silver, that not only the percentage and thousandths fine may be obtained as above, but also the value in dollars per ton for gold and silver, the same scale being common to all four methods of assaying.

In order that the device may be made easily portable, it is made to pack in small compass, the parts being designed of suitable shape for that purpose. The weights fit in their receptacles, as described. The light beam is held in its place by the lugs, as described, and the pans with their threads or cords and hooks are fitted on the bottom of the case so as to occupy no room, springing on said case so as to remain in position. The large beam I being made of a peculiar semi-cylindrical form, as shown, is slipped over the tube G, on the side of the case, and one corner of the lower center portion is bent, as shown at $l$, so as to catch over the corner of the weight-box and keep it securely closed. A pair of pliers, P, also fits in the case, the points being pressed together and pushed under a space left for them under the knife-edge support, and they are thus held in position. The small balancing-clasp $e$, which fits on the beam, is snapped onto these pliers, and thus kept in place, and the small pan $d$ is placed between the two parts of the pliers, and also held firmly.

When these various parts and the larger scale-pans are slid under the several parts are all in position. They may be slipped as a whole into the receiving-box L, which is made of suitable size to hold the apparatus.

Being extremely portable, delicate, simple, and efficient, this apparatus is of great use to prospectors, as it does away with the necessity of expensive balances, which occupy considerable room, require care, a suitable house for their use, and some skill for their management. This apparatus contains all that is required for such simple assays as prospectors need to make, and obviates the necessity of any calculation being made, the weights being self-calculating. It is especially devised for blow-pipists.

It then affords a portable, convenient, self-calculating, and exceedingly delicate weigher of minute buttons, and such assays may be made with so much greater accuracy and value; but it may be also used for furnace-assay buttons, either by its self-calculation on the scale or, for those who may prefer it, by attaching the pan and weighing by decimated troy weights in the pan itself, which may be still read under the self-calculating mode, or by any more ordinary manner.

Having thus described my invention, what I claim as new, and desire to secure by Letters Patent, is—

1. The stand or case A, with its transverse partition and inverted knife-edge B, and the retaining-spring caps E, in combination with the scale-beam C, whereby said beam may be balanced for use or held securely in place, substantially as herein described.

2. The beam C, having the knife-edge crook b at one end and the conical platinum-holding cup c, forming a part of it, at the other end, said cup assuring the correct and central position of the button to be weighed, substantially as herein described.

3. The stand or case A, with its transverse partition and knife-edge B, to support and balance the beam C, with its saddle F, said beam having the conical holding-cup c rigidly secured to one end, while the other end is formed to sustain the aluminum-pan d, in combination with the adjustable clasp e, which is horizontally attached to the beam to balance said pan and save friction, substantially as herein described.

4. The improvement in the construction of delicate weighing-scale beams, consisting in supporting the beam C upon the single knife-edge B by means of the single inverted-V-shaped saddle F, and providing the beam with the fixed conical cup c at one end, whereby all the frictions of moving parts or knife-edges are reduced to one, substantially as herein described.

5. The scale-beam C, supported upon the transverse knife-edge B, and fitted with the balance-weight a and the riders g, as shown, in combination with the case or stand A, with its graduated scale f, whereby value per ton, fineness, or percentage may be ascertained by the position of the riders without either reading figures or making any calculation, substantially as herein described.

6. The stand or case A, with its transverse partition and knife-edge B, to support the scale-beam C, in combination with the weight-box D, having its corner secured by the angle l of the beam I, substantially as herein described.

7. The semi-tubular beam I, having its ends tapered, and having the central V-shaped slot h, by which to balance it upon the outer end of the knife-edge B and support the pans K, as shown, in combination with the case A, with its curved or tubular weight-holder G, said curved portion serving to hold the beam I in place when not in use, substantially as herein described.

8. The scale f, either upon or opposite the beam, with its dividing-lines graduated decimally, as shown, in combination with the case A and the scale-beams C or I, with their weights or riders g or S-C, whereby the weight, value per ton, fineness, or percentage of the sample may be determined without the use of figures or further calculation, substantially as herein described.

In witness whereof I have hereunto set my hand.

JOSIAH S. PHILLIPS.

Witnesses:
FRANK A. BROOKS,
CHAS. G. YALE.